(12) United States Patent
Nagayama et al.

(10) Patent No.: US 7,819,588 B2
(45) Date of Patent: Oct. 26, 2010

(54) BEARING DEVICE FOR DRIVE WHEEL

(75) Inventors: Yasuhisa Nagayama, Utsunomiya (JP);
Aya Suzuki, Mooka (JP); Masanori Kosugi, Utsunomiya (JP); Yoshihiro Tokuda, Mooka (JP)

(73) Assignee: Honda Motor Co., Ltd., Tokyo (JP)

( * ) Notice: Subject to any disclaimer, the term of this patent is extended or adjusted under 35 U.S.C. 154(b) by 595 days.

(21) Appl. No.: 11/793,395

(22) PCT Filed: Mar. 23, 2006

(86) PCT No.: PCT/JP2006/305878

§ 371 (c)(1),
(2), (4) Date: Jun. 19, 2007

(87) PCT Pub. No.: WO2006/109499

PCT Pub. Date: Oct. 19, 2006

(65) Prior Publication Data

US 2008/0131045 A1 Jun. 5, 2008

(30) Foreign Application Priority Data

Mar. 31, 2005 (JP) ............................. 2005-103335
Mar. 31, 2005 (JP) ............................. 2005-104009

(51) Int. Cl.
*F16C 33/76* (2006.01)

(52) U.S. Cl. .................. 384/544; 384/488; 464/178

(58) Field of Classification Search ................ 384/544, 384/589, 480, 488; 301/105.1; 464/145, 464/178, 906

See application file for complete search history.

(56) References Cited

U.S. PATENT DOCUMENTS

| 4,798,560 | A | * | 1/1989 | Farrell | .................. 464/178 |
| 4,881,842 | A | | 11/1989 | Farrell et al. | |
| 5,451,869 | A | | 9/1995 | Alff | |
| 5,885,162 | A | | 3/1999 | Sakamoto et al. | |
| 6,413,008 | B1 | * | 7/2002 | van Dest et al. | .......... 403/359.1 |
| 6,550,975 | B2 | * | 4/2003 | Inoue et al. | ................. 384/537 |
| 6,676,226 | B2 | * | 1/2004 | Hahn | ...................... 301/105.1 |
| 6,715,926 | B2 | | 4/2004 | Tajima et al. | |
| 2002/0110299 | A1 | * | 8/2002 | Schote | ....................... 384/544 |
| 2004/0095015 | A1 | | 5/2004 | Kai et al. | |
| 2004/0197039 | A1 | | 10/2004 | Sakamoto et al. | |

FOREIGN PATENT DOCUMENTS

| JP | 56-77404 U | | 6/1981 |
| JP | 63-70405 U | | 5/1988 |
| JP | 63-76504 | * | 5/1988 |

(Continued)

*Primary Examiner*—Thomas R Hannon
(74) *Attorney, Agent, or Firm*—Birch, Stewart, Kolasch & Birch, LLP

(57) ABSTRACT

A bearing device for a drive wheel having a knuckle member surrounding a part of a cup part through a clearance. An annular first seal member is disposed between the knuckle member and an outer ring member. An opening part is formed between the peripheral edge part of the knuckle member and the large diameter end part of a joint boot. A recessed part formed in the first seal member is installed to be opened toward the joint boot.

9 Claims, 11 Drawing Sheets

FOREIGN PATENT DOCUMENTS

| | | |
|---|---|---|
| JP | 63-133641 A | 6/1988 |
| JP | 63-133641 U | 9/1988 |
| JP | 3-7529 U | 1/1991 |
| JP | 3-279061 A | 12/1991 |
| JP | 6-71969 U | 10/1994 |
| JP | 6-308145 A | 11/1994 |
| JP | 9-242773 A | 9/1997 |
| JP | 2000-221203 A | 8/2000 |
| JP | 2001-83166 A | 3/2001 |
| JP | 2001-294011 A | 10/2001 |
| JP | 2002-172912 A | 6/2002 |
| JP | 2002-316508 A | 10/2002 |
| JP | 2003-175701 A | 6/2003 |
| JP | 2003-262232 A | 9/2003 |
| JP | 2004-132782 A | 4/2004 |
| JP | 2004-162744 A | 6/2004 |

* cited by examiner

BEARING DEVICE FOR DRIVE WHEEL

TECHNICAL FIELD

The present invention relates to a bearing apparatus (device) for a drive wheel for supporting a wheel on an automotive vehicle body, for example. More specifically, the present invention relates to a bearing apparatus for a drive wheel, which can prevent entry of water, muddy water, dust or the like into the vicinity of a hub bearing.

BACKGROUND ART

A rotational speed detection mechanism has been attached to, for example, an automotive wheel bearing apparatus for detecting a rotational speed of a wheel in order to control an Antilock Brake System (ABS), a Traction Control System (TCS), or the like. The rotational speed detection mechanism is made up of a magnetic ring or the like and a rotational speed sensor. The magnetic ring or the like is provided on a rotational member that rotates integrally with the wheel, such that the magnetic characteristics thereof cyclically change circumferentially. The rotational speed sensor is provided on a member fixed to an automotive body. In this case, the magnetic ring or the like is attached to an inner member (inner race) side of the wheel bearing apparatus, and the rotational speed sensor is attached to an outer member (outer race) side.

Patent Documents 1 to 5 disclose technical concepts in which the magnetic ring is assembled integrally with a hub bearing, in view of attachment (assembly) workability, replacement workability, the installation space, and so on.

Also, seal members have been provided for preventing entry of water or the like into the hub bearing. Patent Documents 1 to 5 consider sealing performance for a hub bearing, as well as the positional relationship between a magnetic ring and a rotational speed sensor.

Further, Patent Documents 6 to 9 disclose technical concepts related to improving the sealing performance for a hub bearing using various seal members.

In the above-mentioned conventional sealing structures, however, a seal member is disposed in the vicinity of the balls of a hub bearing. For example, water, muddy water or the like, which enters around the seal member, adversely affects the rotational speed sensor that is arranged in the vicinity of the hub bearing.

Also, when the above-mentioned conventional sealing structures are applied to a bearing apparatus for a wheel, in an independent four-wheel drive vehicle for example, and a large amount of muddy water or the like is splashed by the front wheels of the independent four-wheel drive vehicle, it is hard to prevent such muddy water from entering inside passages which are in communication with the hub bearings in the rear wheels. Thus, the rotational speed sensors arranged in such passages in communication with the hub bearings cannot be suitably protected.

Further, the above-mentioned conventional sealing structures center on the prevention of entry of water, muddy water or the like, but do not consider ways of discharging water, muddy water or the like that has already entered.

Patent Document 1: Japanese Laid-Open Patent Publication No. 3-279061;
Patent Document 2: Japanese Laid-Open Patent Publication No. 6-308145;
Patent Document 3: Japanese Laid-Open Patent Publication No. 2001-83166;
Patent Document 4: Japanese Laid-Open Patent Publication No. 2000-221203;
Patent Document 5: Japanese Laid-Open Patent Publication No. 2004-132782;
Patent Document 6: Japanese Laid-Open Patent Publication No. 2001-294011;
Patent Document 7: Japanese Laid-Open Patent Publication No. 2002-172912;
Patent Document 8: Japanese Laid-Open Patent Publication No. 2003-175701; and
Patent Document 9: Japanese Laid-Open Utility Model Publication No. 63-133641.

DISCLOSURE OF THE INVENTION

It is a general object of the present invention to provide a bearing apparatus for a drive wheel, which allows a certain amount of water, muddy water or the like to enter into a predetermined portion in the vicinity of a hub bearing, and which can then smoothly discharge the water, muddy water or the like, which has entered into the predetermined portion, to the outside.

A main object of the present invention is to provide a bearing apparatus for a drive wheel, which performs a sealing function with a seal member to prevent water, muddy water or the like from entering in between the seal member and a surrounding member, and which performs a discharging function with the seal member in order to suitably discharge the water, muddy water or the like as it is about to enter.

According to the present invention, a first seal member is provided between an inner surface of a surrounding member and an outer surface of the outer race member. The first seal member is annular in shape, and has a substantially U-shaped cross section, with a recess being formed on the first seal member that is opened toward the joint boot. Thus, the water, muddy water or the like, which enters an opening between a circumferential edge of the surrounding member and a large-diameter end of the joint boot, is trapped by the recess of the first seal member.

The water or the like trapped by the recess of the first-seal member gathers and accumulates on the lower side of the recess of the first seal member by gravity or by centrifugal force, upon rotation of the outer race member. The accumulated water, muddy water or the like flows out from the recess of the first seal member, and is discharged outside through an inner surface on a lower side of the surrounding member and the opening.

Therefore, according to the present invention, even if a certain amount of water or the like enters from the opening, such water is trapped by the recess of the first seal member, and the trapped water then is smoothly discharged to the outside through the opening. Thus, the water or the like is prevented from entering inside the hub bearing, and the rotational speed sensor arranged in the vicinity of the hub bearing can be protected from adverse effects of water ingress or the like.

In this case, the first seal member preferably comprises a first externally disposed annular side portion, a second internally disposed annular side portion fastened to an outer surface of an outer race member, and a third annular side portion joining the first annular side portion and the second annular side portion, wherein the first annular side portion and the second annular side portion are arranged oppositely and substantially in parallel, and the first annular side portion and the second annular side portion are separated from each other by a predetermined distance.

Further, a radial distance between an outer end of the first seal member and the inner surface of the surrounding member is relatively small compared with other portions in the gap where the first seal member is not disposed, so that the sealing function is performed.

Furthermore, it is preferable for an annular second seal member to be provided at a portion that is close to the first seal member, where a projection of the surrounding member faces the outer surface of the outer race member.

According to the present invention, further, a clearance is formed between the outside surface of the third seal member and the inner surface of the surrounding member, which face each other, wherein the clearance performs a sealing function to prevent entry of water, muddy water or the like into the gap. The inside surface of the third seal member traps the water, muddy water or the like that is about to enter the gap. The water, muddy water or the like trapped by the inside surface of the third seal member accumulates on the lower side of the third seal member by gravity or centrifugal force upon rotation of the outer race member. The accumulated water, muddy water or the like flows outwardly from the third seal member, and is discharged to the outside.

Thus, according to the present invention, smooth use is made of both the sealing function performed by the outside surface of the third seal member, and the discharging function to discharge to the outside the water, muddy water or the like that has been trapped by the inside surface of the third seal member. Thus, water or the like is prevented from entering into the hub bearing, and adverse effects of such entered water or the like on the rotational speed sensor arranged in the vicinity of the hub bearing can be avoided.

In this case, it is preferable for the third seal member to comprise an outer first annular side portion, a second annular side portion, a third annular side portion, and a fourth annular side portion, wherein the first annular side portion extends in a direction substantially perpendicular to an axis of the outer race member, the second annular side portion is bent from the first annular side portion and extends substantially in parallel to the axis of the outer race member, the third annular side portion is bent from the second annular side portion and extends in a direction substantially perpendicular to the axis of the outer race member, and the fourth annular side portion is bent from the third annular side portion and extends substantially in parallel to the axis of the outer race member.

BEST MODE FOR CARRYING OUT THE INVENTION

Figure 1:
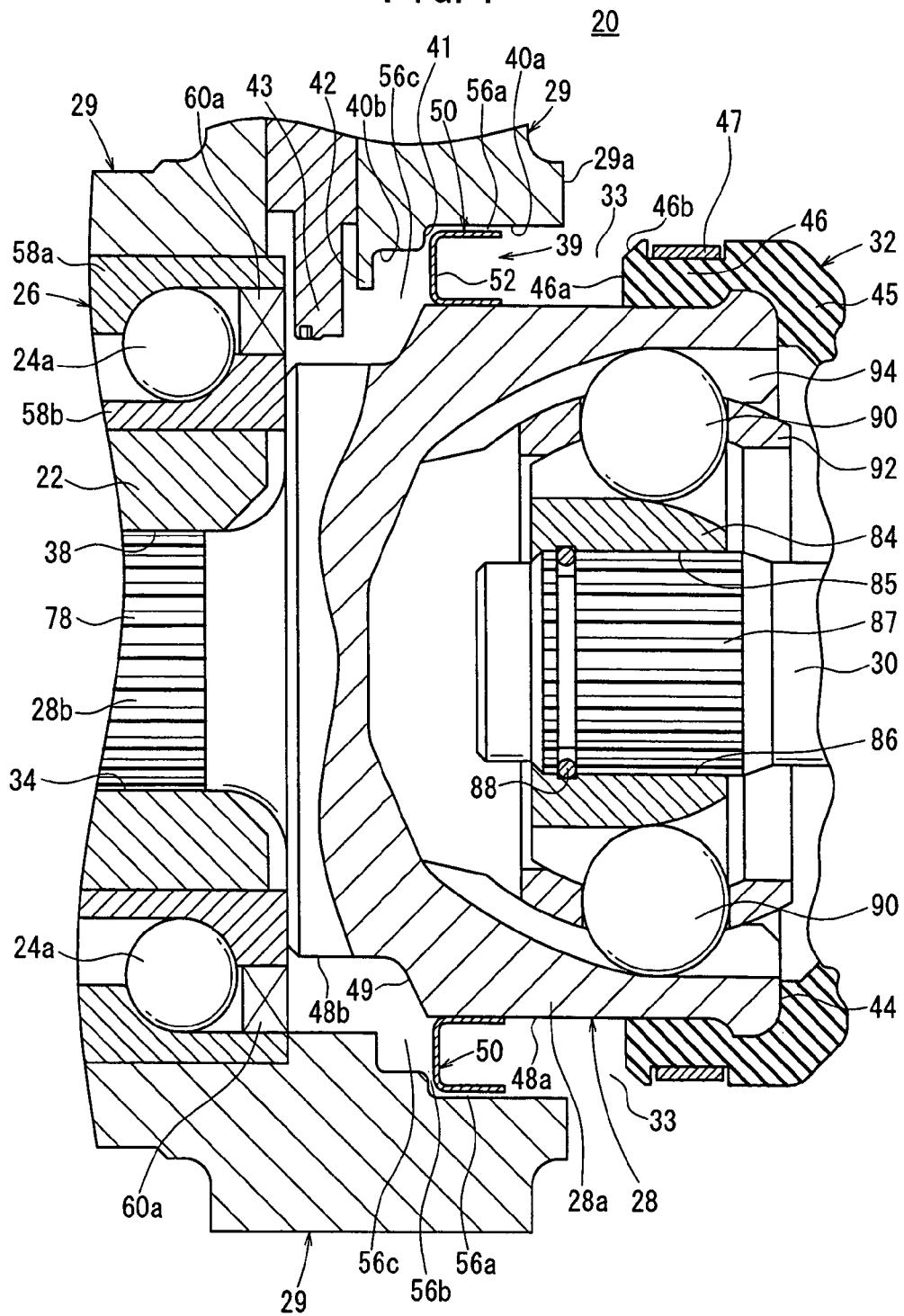
FIG. 1 is a longitudinal cross-sectional view, partly omitted, of a bearing apparatus for a drive wheel, according to a first embodiment of the present invention.

In FIG. 1, reference numeral 20 denotes a bearing apparatus for a drive wheel, according to a first embodiment of the present invention.

The bearing apparatus 20 for a drive wheel comprises a hub 22 to which a wheel of an automobile or the like is attached, a hub bearing 26 having rolling members 24a, 24b (the rolling member 24b is not shown) formed by a plurality of steel balls, wherein the steel balls are fitted on part of an outer circumferential surface of the hub 22 and are rollably supported by an unillustrated holder, an outer race member 28 fitted inside the hub 22, and a knuckle member (surrounding member) 29 arranged on an outer circumferential side of the hub 22 and the hub bearing 26.

The outer race member 28 makes up part of a first Birfield-type constant velocity universal joint 32. The first constant velocity universal joint 32 is connected to one end of a drive shaft 30, which transmits a drive power from an engine or the like. A second tripod type constant velocity universal joint (not shown) is connected to the other end of the drive shaft 30. The second constant velocity universal joint is further connected to an unillustrated differential device.

A through hole 34 is formed substantially in the center of the hub 22 in the axial direction. Serration grooves 38 (or spline grooves) are formed on an inner circumferential surface of the through hole 34, substantially in parallel to the axis of the through hole 34.

An unillustrated wheel attachment flange is formed and extends radially outwardly on an outer circumferential surface of the hub 22. An unillustrated brake disc and wheel of an automobile or the like are attached to the wheel attachment flange by a hub bolt (not shown).

Figure 3:
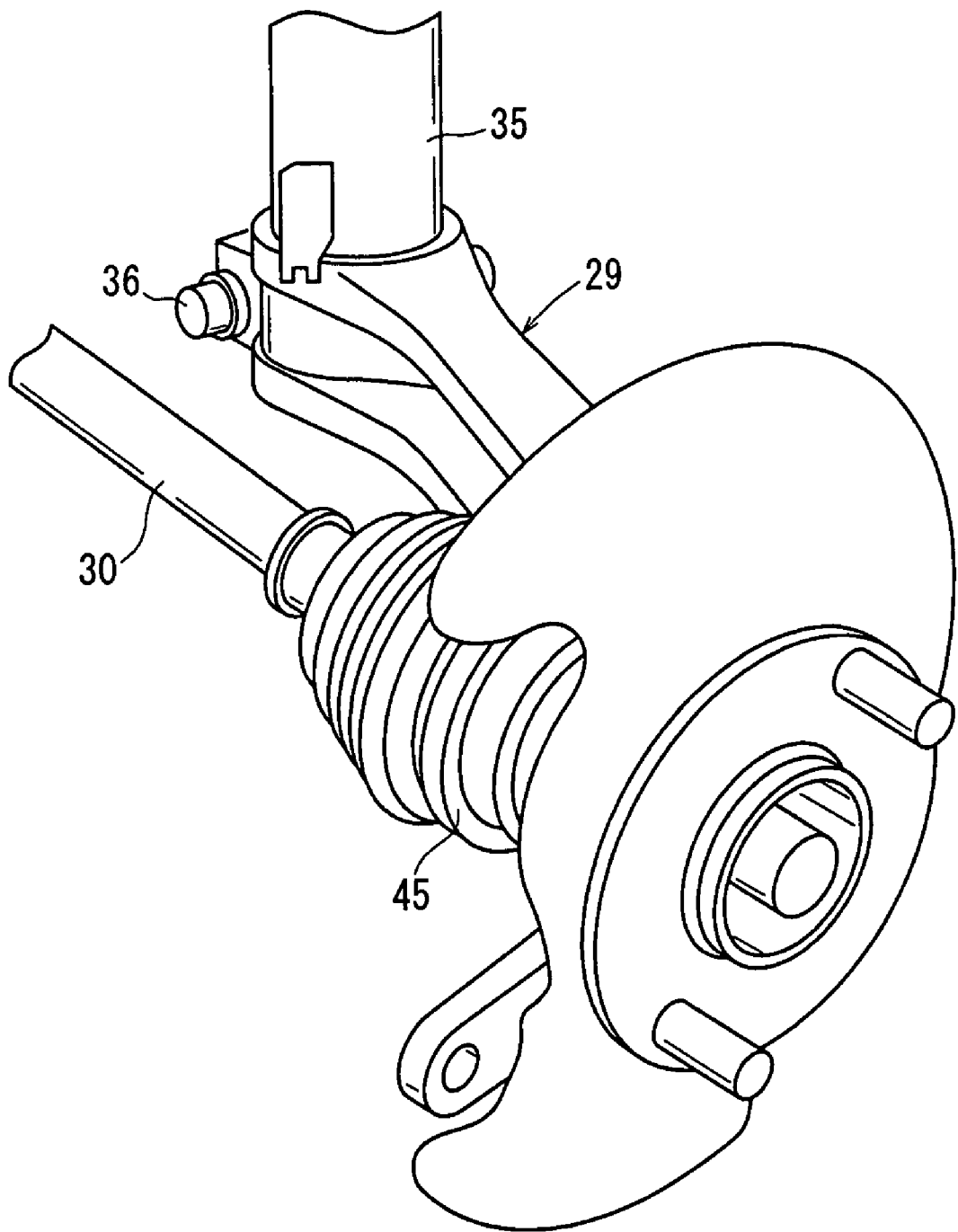
FIG. 3 is a perspective view, partly cut away, showing the manner in which a knuckle member is connected to a supporting post of the bearing apparatus for a drive wheel.

As shown in FIG. 3, the knuckle member 29 is fixed with a bolt 36 around a supporting post 35 of an automobile body suspension device. The hub bearing 26 and the hub 22 are fitted into an inner diameter portion of the knuckle member 29.

Thus, the hub bearing 26 is fixed to an unillustrated automobile body via the knuckle member 29. Therefore, the hub 22 and the outer race member 28 arranged inside the hub bearing 26 are rotatably supported by the hub bearing 26.

As shown in FIG. 1, the knuckle member 29 has an inner wall substantially in parallel to a portion of an outer circumferential surface of the outer race member 28. A gap 39 is formed between the portion of the outer circumferential surface of the outer race member 28 and the inner wall of the knuckle member 29.

As shown in FIG. 1, the inner wall of the knuckle member 29 has a first inner surface 40a, an annular step 41, a second inner surface 40b and a projection 42, extending outwardly in the order mentioned from a circumferential edge 29a. The first inner surface 40a has a large and constant diameter. The annular step 41 continues from the first inner surface 40a, and has a cross section going substantially downwardly, as shown in FIG. 1. The second inner surface 40b continues from the annular step 41 and has a small and constant diameter. The projection 42 continues from the second inner surface 40b, and projects radially inwardly by a predetermined length.

The inner wall of the knuckle member 29 may be formed as an inner surface having a constant inner diameter, without the annular step 41, by combining continuously the first inner surface 40a with the second inner surface 40b.

The circumferential edge 29a extends horizontally along the knuckle member 29, but is positioned away from an end surface 46a of the below-mentioned joint boot 45 by a predetermined length, so that the circumferential edge 29a does not cover the joint boot 45. An opening 33 is formed between the end surface 46a of the joint boot 45 and the circumferential edge 29a. In this case, water, muddy water or the like easily enters inside through the opening 33 to some extent. Also, the opening 33 makes it possible to smoothly and easily discharge any water, muddy water or the like that has temporarily entered inside.

A rotational speed sensor 43 is provided on a portion in the vicinity of the projection 42 of the knuckle member 29, such that the rotational speed sensor 43 projects radially inwardly into the gap 39. The rotational speed sensor 43 comprises a hall element, for example, and outputs a detection signal when the sensor 43 detects a magnetic field generated from an unillustrated magnetic ring.

On the outer circumferential surface of the outer race member 28, extending from a cup end surface 44 toward a shaft portion 28b, a large-diameter end 46 of the joint boot 45 is fastened by a metal band 47, thereby forming a first outer surface 48a, an annular step 49 and a second outer surface 48b. The first outer surface 48a has a substantially constant diameter. The annular step 49 continues from the first outer surface 48a and is slanted downwardly to the left in cross section, as shown in FIG. 1. The second outer surface 48b continues from the annular step 49 up to the bottom of a cup portion 28a. The second outer surface 48b has a substantially constant diameter, which is smaller than the diameter of the first outer surface 48a.

Figure 5:
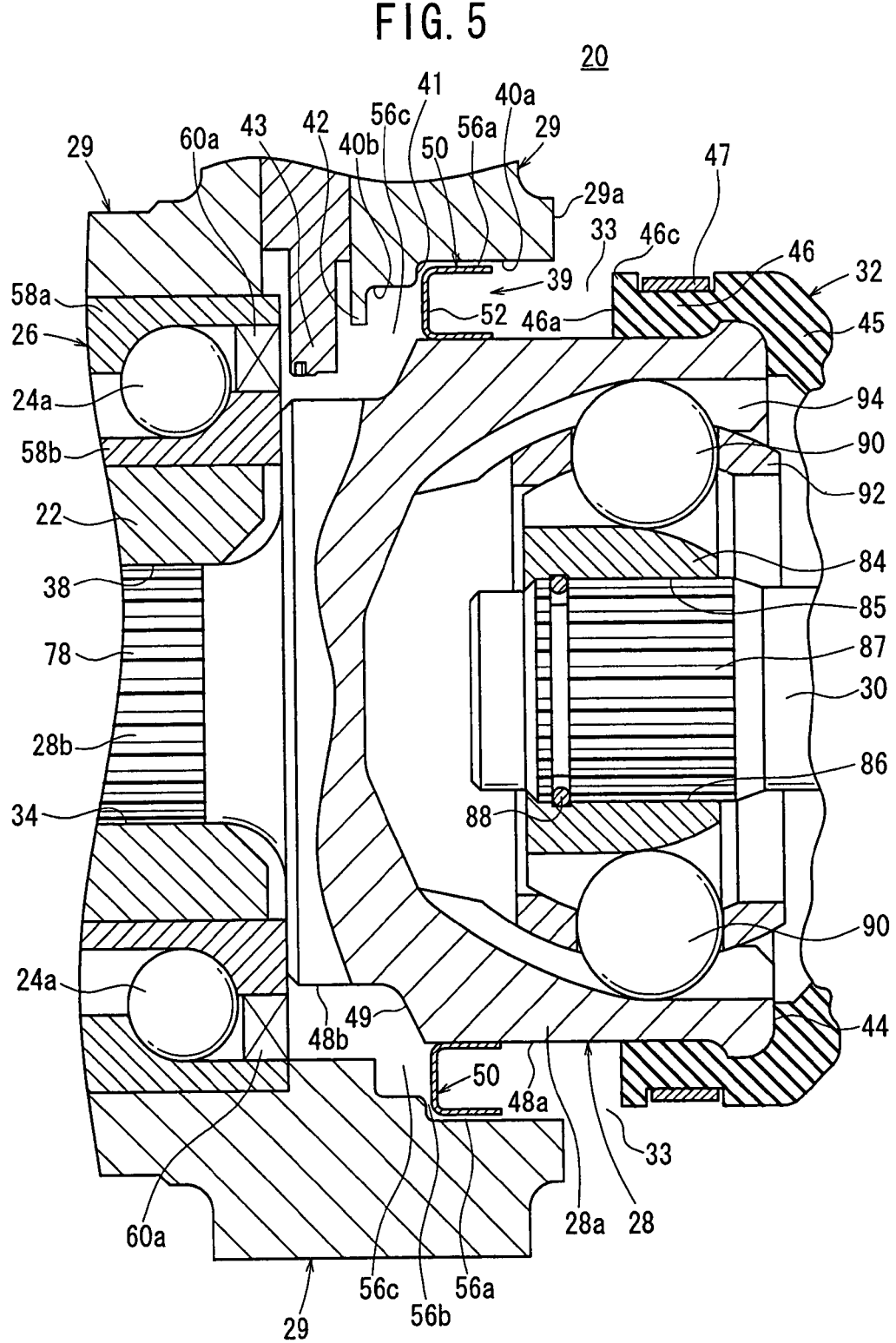
FIG. 5 is a longitudinal cross-sectional view, partly omitted, of a modified example of a large end of a joint boot.

A slanted surface 46b is formed on the end surface 46a of the large-diameter end 46 of the joint boot 45 facing a first seal member 50, to be mentioned later, at a predetermined angle to the first outer surface 48a. The slanted surface 46b makes the opening area of the discharge passage large, so as to discharge to the outside the water, muddy water or the like that has entered into the gap 39. As shown in FIG. 5, instead of the slanted surface 46b, an angulated portion 46c may be formed in the large-diameter end 46 of the joint boot 45.

The annular first seal member 50, which is made of metal, is provided at a portion where the first inner surface 40a of the knuckle member 29 faces the first outer surface 48a of the outer race member 28.

Figure 4:
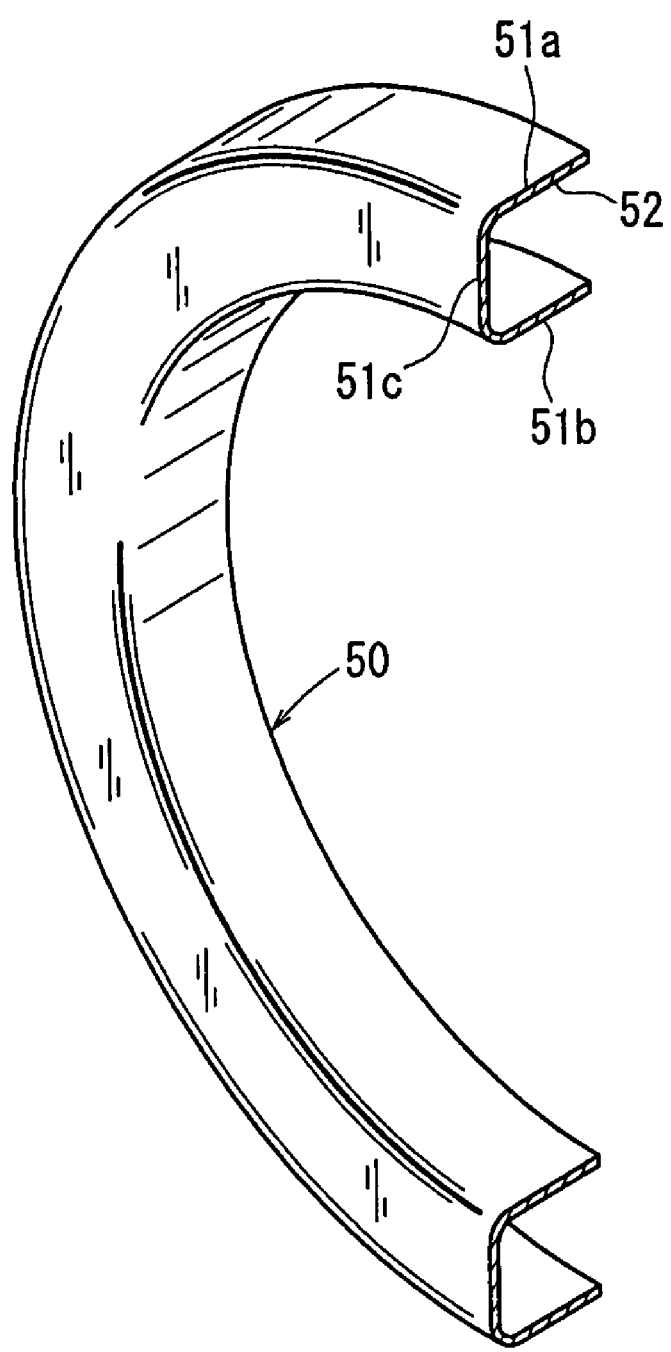
FIG. 4 is a perspective view, partly broken away, of a first seal member provided on the bearing apparatus for a drive wheel shown in FIG. 1.

As shown in FIG. 4, the first seal member 50 comprises an outer first annular side portion 51a, an inner second annular side portion 51b, and a third annular side portion 51c. The first annular side portion 51a and the second annular side portion 51b are arranged oppositely and substantially in parallel, and are spaced away from each other by a predetermined distance. The third annular side portion 51c is positioned perpendicularly to and joins both of the first annular side portion 51a and the second annular side portion 51b, thus forming a substantially U-shaped cross section in its entirety. The first annular side portion 51a, which is disposed on the outside, functions as an outer end of the first seal member 50.

The second annular side portion 51b is in contact with and fastened to the outer circumferential surface of the outer race member 28, so that the first seal member 50 is held on the outer circumferential surface of the outer race member 28. In this case, a recess 52 of the first seal member 50, which is formed by the first annular side portion 51a and the second annular side portion 51b, is directed toward the outside, or stated otherwise, opens toward the joint boot 45.

In other words, the recess 52 of the first seal member 50 opens toward a direction that prevents water, sludge or the like from entering through the gap 39 formed between the knuckle member 29 and the outer race member 28, and thus, the entered water, sludge or the like accumulates within the recess 52.

In this arrangement, a first clearance 56a, a second clearance 56b and a third clearance 56c are provided in the gap 39. The first clearance 56a is formed narrowly between the first inner surface 40a of the knuckle member 29 and the first annular side portion 51a of the first seal member 50, and extends only over the length of the first annular side portion 51a. The second clearance 56b is formed narrowly between the annular step 41 of the knuckle member 29 and the third annular side portion 51c of the first seal member 50. The third clearance 56c is formed with a large separation distance, between the second inner surface 40b of the knuckle member 29 and the annular step 49 of the outer race member 28.

As shown in FIG. 1, the hub bearing 26 comprises an externally disposed first cylinder 58a and an inwardly disposed second cylinder 58b. Annular seal members 60a, 60b are attached between the first cylinder 58a and the second cylinder 58b at both ends of the hub bearing 26 in the axial direction (the annular seal member 60b is not shown). Thus, fluid, dust or the like is prevented from entering inside of the hub bearing 26 where the rolling members 24a, 24b roll.

The outer race member 28 is integrally made up of the cup portion 28a at one end and the columnar shaped shaft portion 28b at the other end thereof. The shaft portion 28b is fitted into the through hole 34 of the hub 22.

Serrations 78 (or splines) are formed in an outer circumferential surface of the shaft portion 28b, wherein the serrations 78 are fitted into serration grooves 38 (or spline grooves) when the shaft portion 28b is inserted into the through hole 34 of the hub 22.

That is, the serrations 78 (or splines) of the shaft portion 28b mesh with the serration grooves 38 (or spline grooves) of the hub 22, such that the outer race member 28 is serration-fitted (or spline-fitted) with the hub 22. Since the outer race member 28 is restricted from rotating relatively to the hub 22, the outer race member 28 and the hub 22 are rotated integrally when a drive force is transmitted via the first constant velocity universal joint 32.

When the serration grooves 38 are formed on the inner circumferential surface of the through hole 34, the serrations 78 are correspondingly formed on the outer circumferential surface of the shaft portion 28b. When spline grooves are formed on the inner circumferential surface of the through hole 34, splines are correspondingly formed on the outer circumferential surface of the shaft portion 28b.

When the shaft portion 28b of the outer race member 28 is inserted into the through hole 34, a bottom surface of the cup portion 28a of the outer race member 28 abuts against an end surface of the hub bearing 26 in order to position the outer race member 28 in the axial direction. The tip of the shaft portion 28b is fixed by an unillustrated fastening mechanism or bolt, for example, whereby the hub 22 is firmly fixed to the outer race member 28. In this case, the outer race member 28 is displaced integrally with the hub 22 in the axial direction, as well as rotationally.

The large-diameter end 46 of the bellows-like joint boot 45 is fastened onto the outer circumferential surface of the outer race member 28 by the large-diameter metal band 47. Further, a small-diameter end of the joint boot 45 is attached to an outer circumferential surface of the drive shaft 30 by a small-diameter metal band (not shown).

An inner ring 84 having an outer substantially spherical surface is inserted into the inner portion of the outer race member 28. A through hole 86 penetrates in the axial direction along a substantially central portion of the inner ring 84, wherein an inner circumferential surface of the through hole 86 has spline grooves 85 thereon. The spline grooves 85 of the through hole 86 are formed substantially in parallel to an axial direction of the inner ring 84. Splines 87, corresponding to the through hole 86, are formed on an outer circumferential surface of the end of the drive shaft 30, which is to be inserted into the through hole 86.

The end of the drive shaft 30 is inserted into the through hole 86 such that the splines 87 mesh or are spline-fitted with the spline grooves 85 of the through hole 86. Since the inner ring 84 is restricted from rotating relatively with respect to the drive shaft 30, the drive shaft 30 and the inner ring 84 are rotated integrally. That is, the drive force from an unillustrated engine or the like is reliably transmitted via the drive shaft 30 to the inner ring 84.

A substantially C-shaped stopper member 88 is fitted in an annular groove at the end of the drive shaft 30 that has the splines 87. The stopper member 88 has a certain elasticity, which is directed radially outward. Thus, through engagement of the stopper member 88, the drive shaft 30 is prevented from becoming detached from the inner ring 84.

A plurality of balls 90 are provided circumferentially at equally spaced angles between the inner ring 84 and the outer race member 28. The balls 90 are rotatably housed within retaining windows of retainers 92, and engage with track grooves 94 formed on an inner surface of the outer race member 28. The track grooves 94 extend in an axial direction of the outer race member 28, wherein the number of the track grooves 94 is the same as the number of balls 90.

The bearing apparatus 20 according to the first embodiment of the present invention is basically constructed as described above. Next, operations and effects thereof shall be described below.

The drive force, which is generated by an unillustrated engine or the like, is transmitted from an unillustrated second constant velocity universal joint to the drive shaft 30, whereby the inner ring 84 that is spline-fitted with the drive shaft 30 is rotated integrally therewith. Then, the outer race member 28 of the constant velocity universal joint 32 is rotated through engagement between the balls 90 around the inner ring 84 and the track grooves 94.

Since the serrations 78 (or splines) on the shaft portion 28b mesh with the inside of the through hole 34 of the hub 22, the outer race member 28 and the hub 22 rotate integrally through the hub bearing 26 that is fixed to an unillustrated automobile body via the knuckle member 29.

The drive force generated by an engine or the like is transmitted to an unillustrated brake disc and wheel, which are attached via the wheel attachment flange of the hub 22.

In the first embodiment, the opening 33 is formed between the horizontal circumferential edge 29a of the knuckle member 29 and the end surface 46a of the joint boot 45. When water, muddy water or the like enters into the gap 39 through the opening 33, such water or the like is prevented from further entering toward the side of the rotational speed sensor 43 by the sealing function of the narrow first clearance 56a, located between the first inner surface 40a of the knuckle member 29 and the first seal member 50. Also, sewage or the like that is gathered in the recess 52 of the first seal member 50 is smoothly discharged to the outside through the opening 33.

That is, in the first embodiment, any water, muddy water or the like that enters through the opening 33 is allowed to enter up to a predetermined portion where the first seal member 50 is located. Such water or the like is prevented from entering further inside as a result of the sealing function of the narrow first clearance 56a located between the knuckle member 29 and the first seal member 50.

Figure 2:
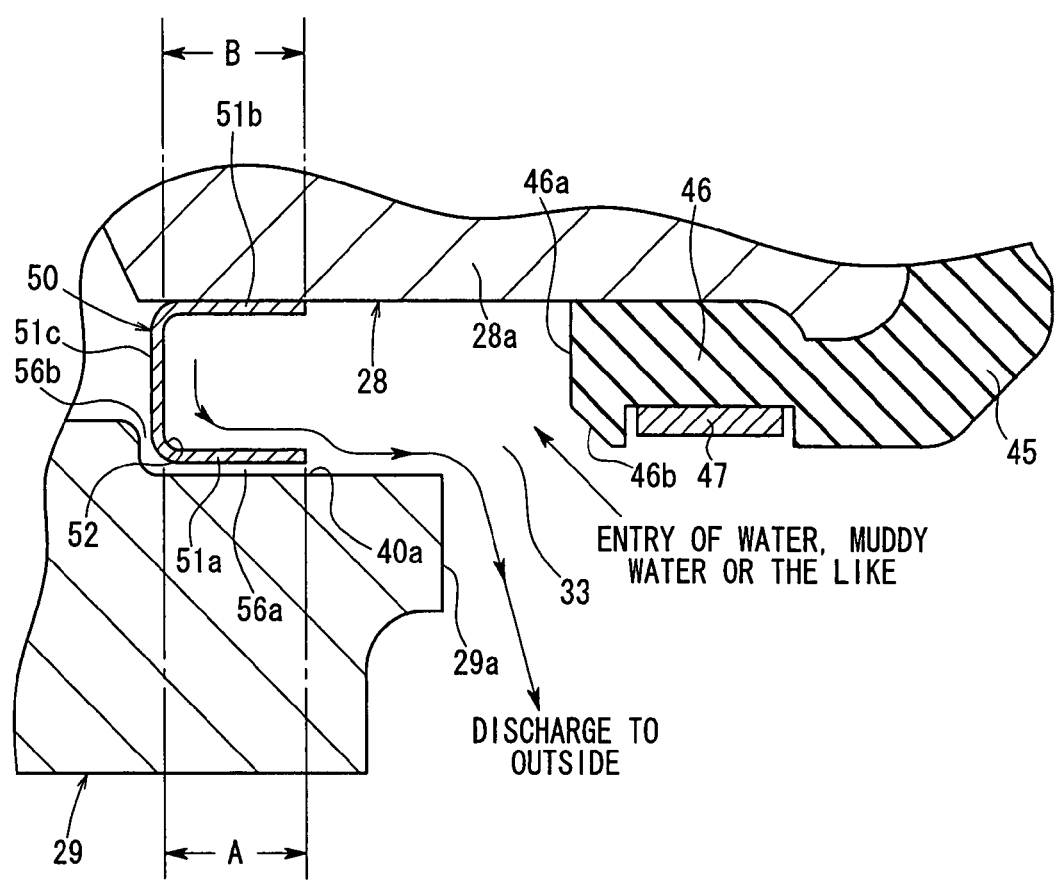
FIG. 2 is a longitudinal cross-sectional view, partly enlarged, of the view shown in FIG. 1.

In this case, the water, muddy water or the like, which is prevented from further ingress, is trapped in the recess 52 of the first seal member 50, which has a substantially U-shaped cross section. Water or the like gathers and accumulates in the lower side of the recess 52 of the first seal member 50, by gravity or centrifugal force upon rotation of the outer race member 28. The accumulated water, muddy water or the like flows out from the inner wall of the recess 52 of the first seal member 50, and is easily discharged to the outside through the first inner surface 40a located on a lower side of the knuckle member 29 and the opening 33 (see FIG. 2).

In the first seal member 50, the outer first annular side portion 51a has a width dimension A, and the inner second annular side portion 51b has a width dimension B. It is preferable to set the width dimensions A and B such that A≧B, and more preferably, such that A>B. This is so that the space provided by the recess 52 having a substantially U-shaped cross section can be increased (i.e., the volume trapped by the recess 52 can be increased), and also so that passage for discharging water, muddy water or the like is extended, so that the passage can be close to the circumferential edge 29a.

In the first embodiment, accordingly, any water, muddy water or the like that enters through the opening 33 is allowed to enter within a predetermined portion. However, the rotational speed sensor 43, which is disposed in a passage in communication with the hub bearing 26, preferably can be protected by a combination of functions, including the sealing function to prevent further entry, as well as the discharging function to smoothly discharge the water, muddy water, further entry of which has been prevented, to the outside through the opening 33.

With respect to the first embodiment, an explanation has been given concerning a bearing apparatus 20 for a drive wheel, which is applied to a Birfield-type constant velocity universal joint. However, the first embodiment is not limited in this respect. The bearing apparatus 20 for a drive wheel is also applicable to an unillustrated tripod-type constant velocity universal joint.

Figure 6:
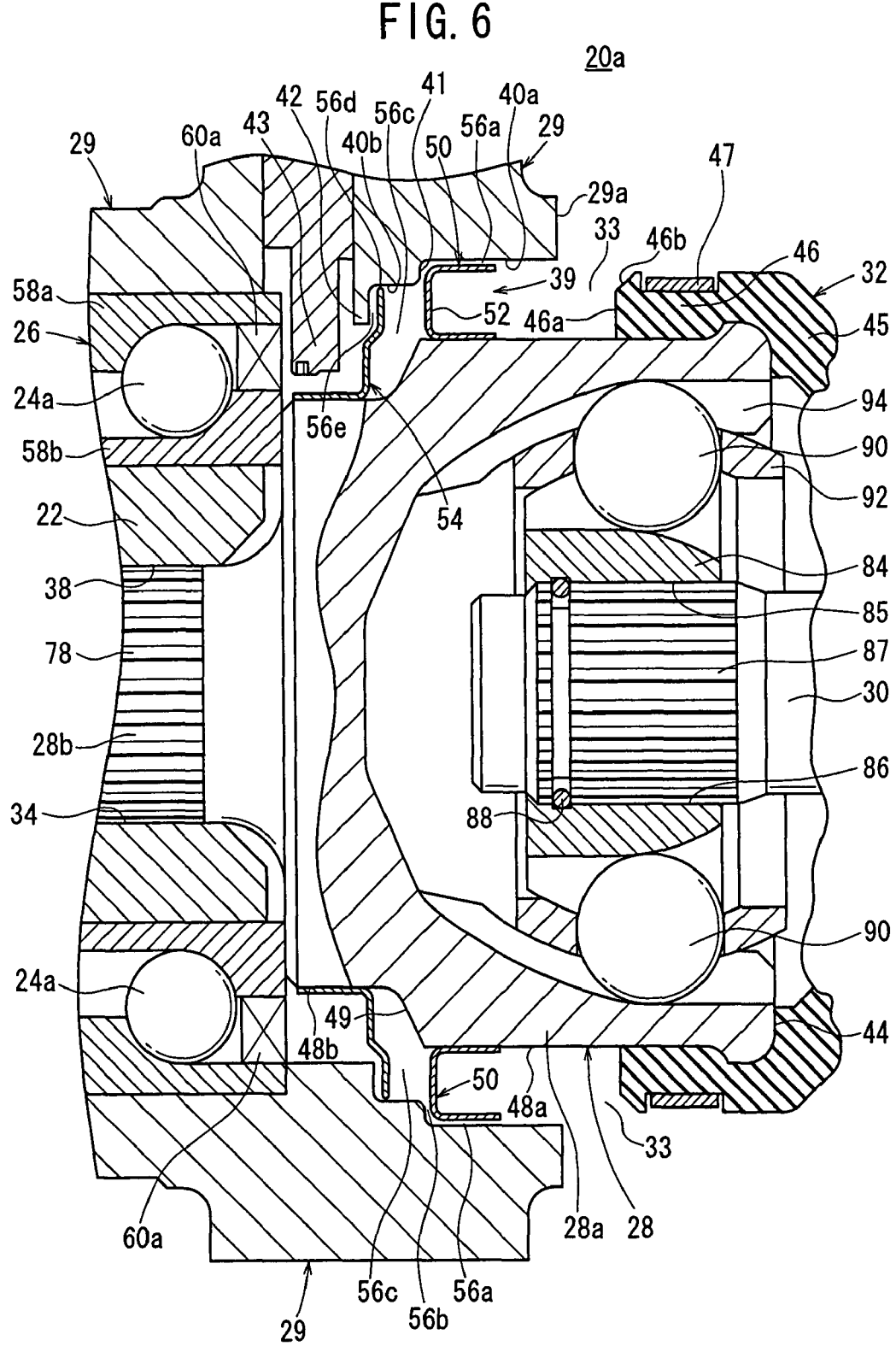
FIG. 6 is a longitudinal cross-sectional view, partly omitted, of a bearing apparatus for a drive wheel, according to a second embodiment of the present invention.

FIG. 6 illustrates a bearing apparatus 20a for a drive wheel, according to a second embodiment of the present invention. In the following explanation of the embodiment, constituent elements that are identical to those of the bearing apparatus 20a shown in FIG. 1 are labeled using the same reference numerals, and descriptions thereof have been omitted.

The bearing apparatus 20a according to the second embodiment differs in that a second seal member 54, having a substantially L-shaped cross section, is disposed on a portion in the vicinity of the first seal member 50. The shape of the second seal member 54 is different from that of the first seal member 50.

More specifically, the annular second seal member 54, which is constructed of metal, is provided at a portion that is close to the first seal member 50, and where the projection 42 of the knuckle member 29 faces the second outer surface 48b of the outer race member 28.

Figure 7:
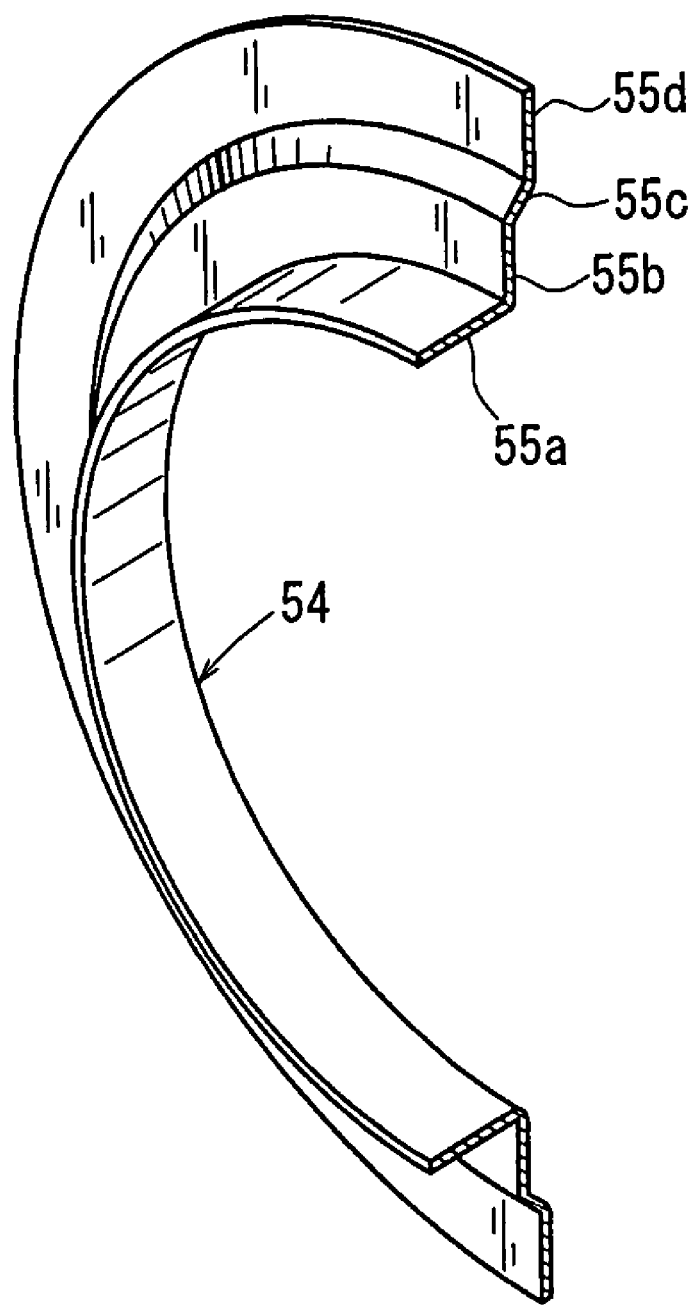
FIG. 7 is a perspective view, partly broken away, of a second seal member provided on the bearing apparatus for a drive wheel shown in FIG. 6.

As shown in FIG. 7, the second seal member 54 comprises a cylindrical portion 55a, a bent portion 55b, a slanted portion 55c, and a circumferential portion 55d. The cylindrical portion 55a is disposed in contact with and fastened to the second outer surface 48b of the outer race member 28, such that the second seal member 54 is held on the outer circumferential surface of the outer race member 28. The bent portion 55b has an L-shaped cross section and is bent in a direction substantially perpendicular to the cylindrical portion 55a. The slanted portion 55c continues from the bent portion 55b, and has a cross section slanted substantially upwardly to the right, as shown in FIG. 6. The circumferential portion 55d continues from the slanted portion 55c, and extends radially and substantially in parallel to the projection 42 of the knuckle member 29, with a predetermined clearance from the projection 42. The circumferential portion 55d also functions as an outer end of the second seal member 54.

In this case, a fourth clearance 56d and a fifth clearance 56e are provided in the gap 39, along with the first to third clearances 56a to 56c mentioned above. The fourth clearance 56d is formed narrowly between the second inner surface 40b of the knuckle member 29 and the circumferential portion 55d of the second seal member 54. The fifth clearance 56e is formed between a wall surface on the projection 42 of the knuckle member 29 and the circumferential portion 55d of the second seal member 54.

Thus, the gap from the wall surface on the knuckle member 29 is further narrowed in the vicinity of the hub bearing 26 by the fourth clearance 56d and the fifth clearance 56e. The sealing function is further enhanced, to better prevent water or the like from entering into the internally disposed hub bearing 26.

As a result, in the second embodiment, water or the like is allowed to enter up to a predetermined portion within the gap 39 where the first seal member 50 is arranged. However, the water or the like is prevented from entering further inside beyond the predetermined portion where the first seal member 50 is arranged. Thus, the rotational speed sensor 43 arranged in the vicinity of the hub bearing 26 can be protected from adverse effects of water ingress or the like. In addition to the seal members 60a, 60b that protect the rolling members 24a, 24b, the first seal member 50 and the second seal member 54 are separately provided. Thus, a large amount of muddy water or the like, which is splashed by the front wheels of an independent four-wheel drive vehicle, for example, can be reliably prevented from entering into the gap 39 leading to the hubs 22 of the rear wheels.

Further, in the second embodiment, even if water or the like enters inside of the gap 39 by passing through the first clearance 56a and the second clearance 56b of the first seal member 50, water or the like that has entered is prevented from further entering toward the side of the hub bearing 26, owing to the second seal member 54 having the L-shaped cross section, and under centrifugal force of the rotating outer race member 28. The water or the like flows downwardly by centrifugal force produced within the outer race member 28, or by gravity, and is discharged to the outside (i.e., to the atmosphere) through steps disposed on the inner wall surface of the knuckle member 29.

Figure 8:
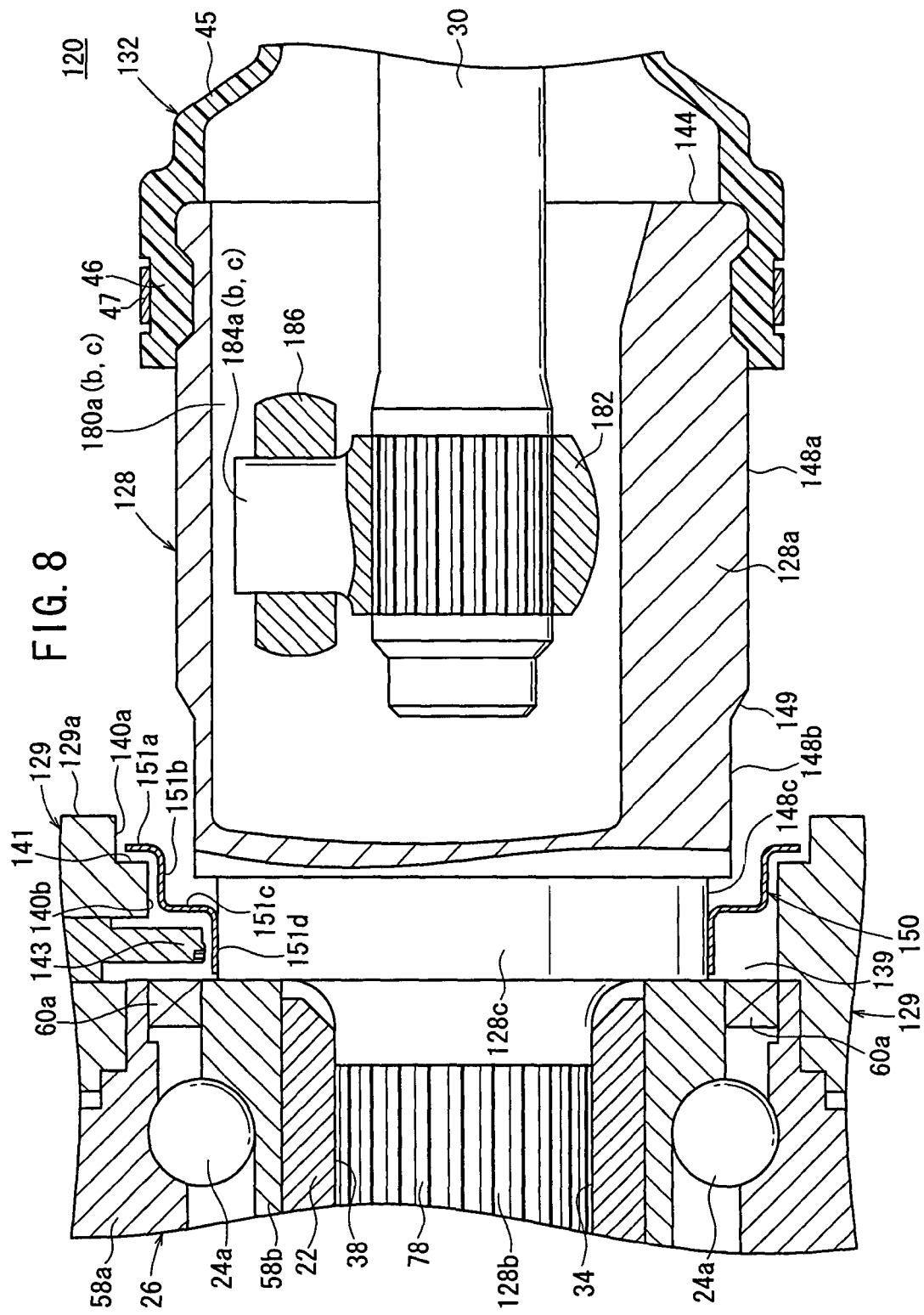
FIG. 8 is a longitudinal cross-sectional view, partly omitted, of a bearing apparatus for a drive wheel, according to a third embodiment of the present invention.

In FIG. 8, reference numeral 120 denotes a bearing apparatus for a drive wheel, according to a third embodiment of the present invention.

The bearing apparatus 120 for a drive wheel comprises a hub 22, to which a wheel of an automobile or the like is attached, a hub bearing 26 having rolling members 24a, 24b (the rolling member 24b is not shown) made up of a plurality of steel balls, which are fitted on part of an outer circumferential surface of the hub 22 and are rollably supported by an unillustrated holder, an outer race member 128 fitted inside of the hub 22, and a knuckle member (surrounding member) 129, which is arranged on an outer circumferential side of the hub 22 and the hub bearing 26 and surrounds a portion of the outer race member 128.

The outer race member 128 makes up a portion of a first tripod type constant velocity universal joint 132. The first constant velocity universal joint 132 is connected to one end of a drive shaft 30, which transmits drive power from an engine or the like. A second tripod type constant velocity universal joint (not shown) is connected to the other end of the drive shaft 30. The second constant velocity universal joint is further connected to an unillustrated differential device.

As shown in FIG. 3, the knuckle member 129 is fixed with a bolt 36 around a supporting post 35 of an automobile body suspension device. The hub bearing 26 and the hub 22 are fitted into an inner diameter portion of the knuckle member 129.

Thus, the hub bearing 26 is fixed to an unillustrated automobile body via the knuckle member 129. Therefore, the hub 22 and the outer race member 128, which are arranged inside the hub bearing 26, are rotatably supported by the hub bearing 26.

As shown in FIG. 8, a gap 139 is formed between a portion of an outer circumferential surface of the outer race member 128 and an inner wall of the knuckle member 129.

As shown in FIG. 8, the inner wall of the knuckle member 129 comprises a first inner surface 140a, an annular step 141 and a second inner surface 140b, arranged in this order from an outwardly extending circumferential edge 129a. The first inner surface 140a has a large and constant diameter. The annular step 141 continues from the first inner surface 140a, and has a substantially downwardly directed cross section as shown in FIG. 8. The second inner surface 140b continues from the annular step 141, and has a small and constant diameter.

A rotational speed sensor 143 is provided on a portion in the vicinity of the second inner surface 140b of the knuckle member 129, such that the rotational speed sensor 143 projects radially inwardly into the gap 139. The rotational speed sensor 43 comprises a hall element, for example, and outputs a detection signal upon detecting a magnetic field generated from an unillustrated magnetic ring.

A large-diameter end 46 of the joint boot 45 is fastened by a metal band 47 onto the outer circumferential surface of the outer race member 128, extending from a cup end surface 144 toward a shaft portion 128b, the outer race member 128 being formed by a first outer surface 148a, an annular step 149, a second outer surface 148b and a third outer surface 148c. The first outer surface 148a has a substantially constant diameter. The annular step 149 continues from the first outer surface 148a with a cross section slanted downwardly to the left as shown in FIG. 8. The second outer surface 148b continues from the annular step 149 up to the bottom of a cup portion 128a, and has a substantially constant diameter, which is smaller than the diameter of the first outer surface 148a. The third outer surface 148c is disposed between the bottom of the cup portion 128a and the shaft portion 128b, and has a substantially constant diameter, which is smaller than the diameter of the second outer surface 148b.

An annular third seal member 150, made of metal, is provided on the third outer surface 148c that faces the inner wall of the knuckle member 129.

Figure 10:
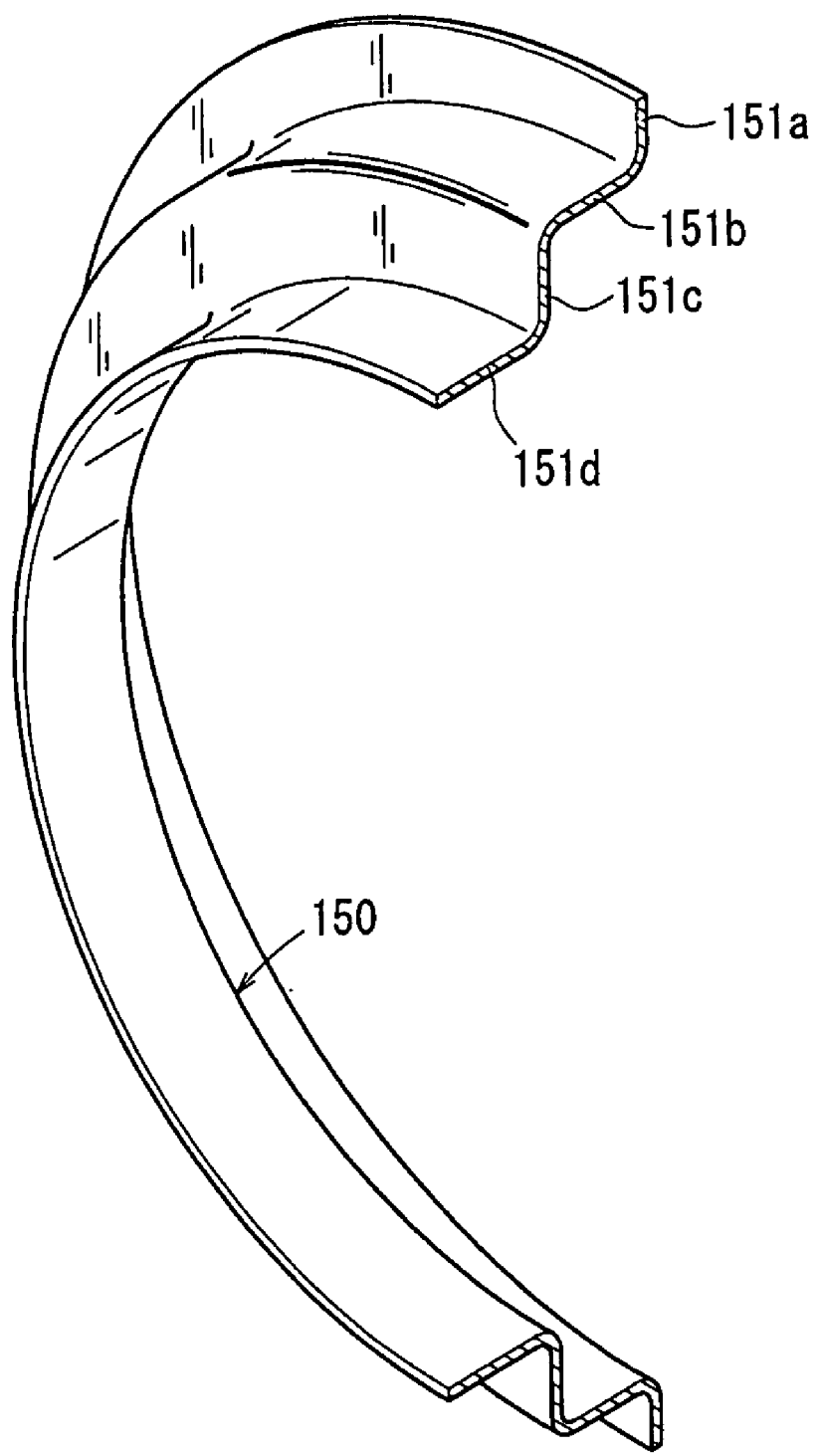
FIG. 10 is a perspective view, partly broken away, of a third seal member provided on the bearing apparatus for a drive wheel shown in FIG. 8.

As shown in FIG. 10, the third seal member 150 has a stepped cross section, and comprises an outer first annular side portion 151a, a second annular side portion 151b, a third annular side portion 151c, and an inside fourth annular side portion 151d. The first annular side portion 151a extends in a direction substantially perpendicular to an axis of the drive shaft 30 (the outer race member 128). The second annular side portion 151*b* is bent from the first annular side portion 151*a*, and extends substantially in parallel to the axis of the drive shaft 30 (the outer race member 128). The third annular side portion 151*c* is bent from the second annular side portion 151*b*, and extends in a direction substantially perpendicular to the axis of the drive shaft 30 (the outer race member 128). The fourth annular side portion 151*d* is bent from the third annular side portion 151*c*, and extends substantially in parallel to the axis of the drive shaft 30 (the outer race member 128).

The fourth annular side portion 151*d* is disposed in contact with and fastened to the third outer surface 148*c* of the outer race member 128, such that the third seal member 150 is held on the outer circumferential surface of the outer race member 128.

In this case, a first clearance 156*a*, a second clearance 156*b* and a third clearance 156*c* are provided between the inner wall of the knuckle member 129 and the outside surface of the third seal member 150. The first clearance 156*a* is formed narrowly between the first inner surface 140*a* of the knuckle member 129 and the tip of the first annular side portion 151*a* of the third seal member 150. The second clearance 156*b* is formed between the annular step 141 of the knuckle member 129 and the outside surface of the first annular side portion 151*a*. The third clearance 156*c* is formed between the second inner surface 140*b* of the knuckle member 129 and the outside surface of the second annular side portion 151*b* of the third seal member 150.

In other words, the third seal member 150 has a stepped cross section corresponding to the stepped cross section of the inner wall of the knuckle member 129. Thus, first to third clearances 156*a* to 156*c* are formed such that the distance between the knuckle member 129 and the third seal member 150 is small. Water, muddy water or the like thereby is prevented from entering into the gap 139, as a result of the sealing function of the first to third clearances 156*a* to 156*c*.

The outer race member 128 is integrally formed with the cup portion 128*a* on one end thereof, the shaft portion 128*b* having a columnar shape at the other end, and with a cylindrical intermediate portion 128*c* disposed between the cup portion 128*a* and the shaft portion 128*b*. The shaft portion 128*b* is fitted into a through hole 34 of the hub 22.

When the shaft portion 128*b* of the outer race member 128 is inserted into the through hole 34, the cylindrical intermediate portion 128*c* of the outer race member 128, which is disposed between the cup portion 128*a* and the shaft portion 128*b*, abuts against an end surface of the hub bearing 26 so as to position the outer race member 128 in the axial direction. When the tip of the shaft portion 128*b* is fixed by an unillustrated fastening mechanism or bolt, for example, the hub 22 is firmly fixed to the outer race member 128. In this case, the outer race member 128 is displaced integrally with the hub 22 in the axial direction, as well as rotationally.

As shown in FIG. 8, three guide grooves 180*a* to 180*c* are formed axially on the inner wall of the outer race member 128, wherein the guide grooves 180*a* to 180*c* are angularly spaced from each other at angles of 120° about an axial center (although the guide grooves 180*b* and 180*c* are not shown in the figure). Further, a ring-shaped spider 182 is fitted onto the end of the drive shaft 30, and three trunnions 184*a* to 184*c* are integrally formed on the outer surface of the spider 182, wherein the trunnions 184*a* to 184*c* are spaced from each other at angles of 120° about the axial center (although the trunnions 184*b* and 184*c* are not shown in the figure). The three trunnions 184*a* to 184*c* project respectively toward the guide grooves 180*a* to 180*c*. Ring-shaped rollers 186 are fitted onto outer circumferential portions of the columnar shaped trunnions 184*a* (184*b*, 184*c*), such that the ring-shaped rollers 186 can slide along the guide grooves 180*a* to 180*c*.

The bearing apparatus 120 according to the third embodiment of the present invention is basically constructed as described above. Next, operations and effects thereof shall be described below.

The drive force, which is generated by an unillustrated engine or the like, is transmitted from an unillustrated second constant velocity universal joint to the drive shaft 30, whereupon the spider 182 that is spline-fitted with the drive shaft 30 rotates integrally with the drive shaft 30. Then, the outer race member 128 of the constant velocity universal joint 132 rotates as a result of engagement between the plural trunnions 184*a* to 184*c* on the spider 182 and the guide grooves 180*a* to 180*c*.

Since serrations 78 (or splines) on the shaft portion 128*b* mesh with the inside of the through hole 34 of the hub 22, the outer race member 128 and the hub 22 are rotated integrally via the hub bearing 26, wherein the hub bearing 26 is fixed to an unillustrated automobile body via the knuckle member 129.

The drive force generated by an engine or the like is transmitted to an unillustrated brake disc and wheel, which are attached via the wheel attachment flange of the hub 22.

In the third embodiment, when water, muddy water or the like enters into the gap 139, such water or the like is prevented from entering further toward the side of the rotational speed sensor 143 as a result of the sealing functions performed by the narrow first clearance 156*a* between the first inner surface 140*a* of the knuckle member 129 and the tip of the first annular side portion 151*a* of the third seal member 150, the second clearance 156*b* between the annular step 141 of the knuckle member 129 and the outside surface of the first annular side portion 151*a*, and the third clearance 156*c* between the second inner surface 140*b* of the knuckle member 129 and the outside surface of the second annular side portion 151*b* of the third seal member 150.

Figure 9:
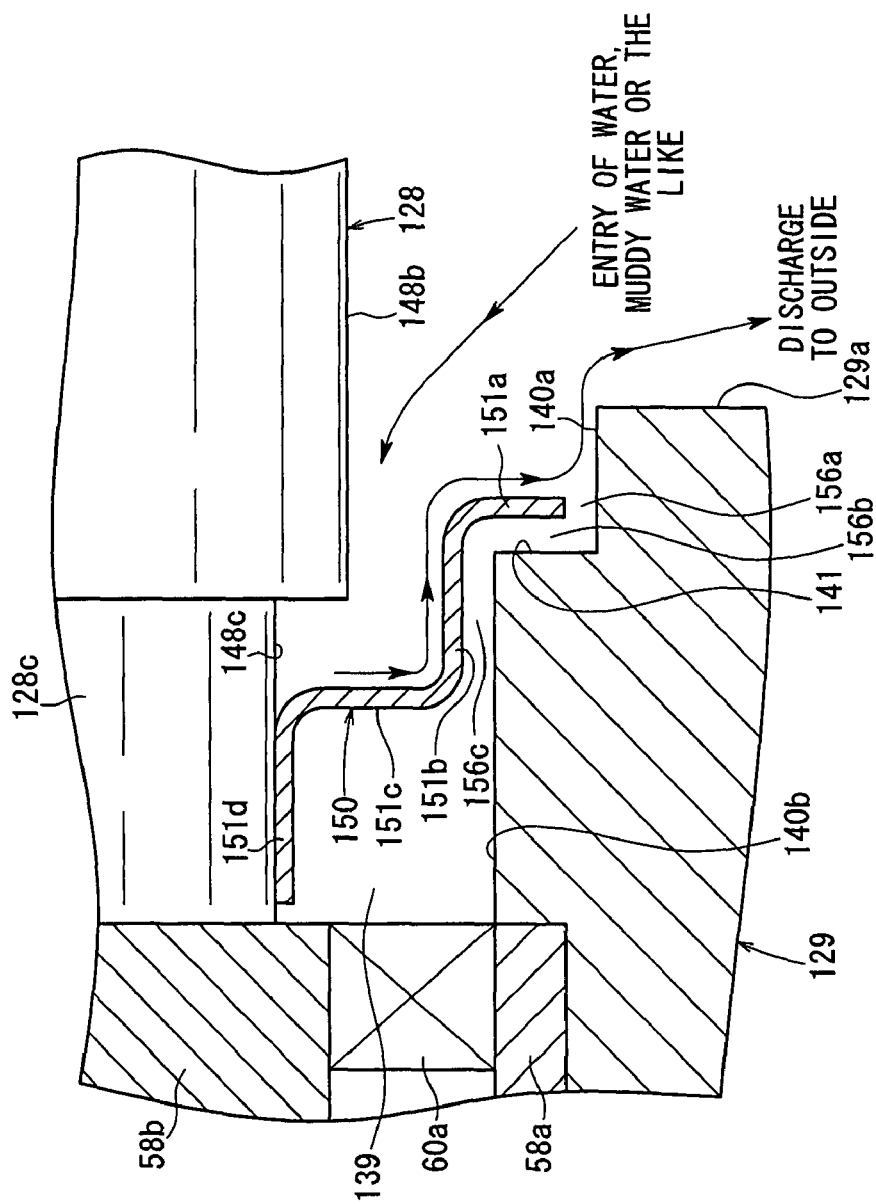
FIG. 9 is a longitudinal cross-sectional view, partly enlarged, of the view shown in FIG. 8.

Also, in the third embodiment, water, muddy water or the like entering into the gap 139 is trapped and accumulates on the inside surface of the third seal member 150 having a stepped shape. Such accumulated water, muddy water or the like flows out from the inside surface of the third seal member 150, by gravity or centrifugal force upon rotation of the outer race member 128, and thus is easily discharged to the outside (see FIG. 9).

In other words, the third seal member 150 achieves dual effects in the form of a sealing function performed between the outside surface of the third seal member 150 and the knuckle member 129, and a discharging function performed by the inside surface of the third seal member 150.

In the third embodiment, accordingly, the rotational speed sensor 143 that is provided on a portion in the vicinity of the hub bearing 26 preferably can be protected by a combination of functions, including the sealing function, which prevents entry of water, muddy water or the like by the narrow clearance provided on a portion in the vicinity of the rotational speed sensor 143 between the outside surface of the third seal member 150 and the knuckle member 129, and the discharging function, which smoothly discharges to the outside the water, muddy water or the like that is trapped by the inside surface of the third seal member 150.

Figure 11:
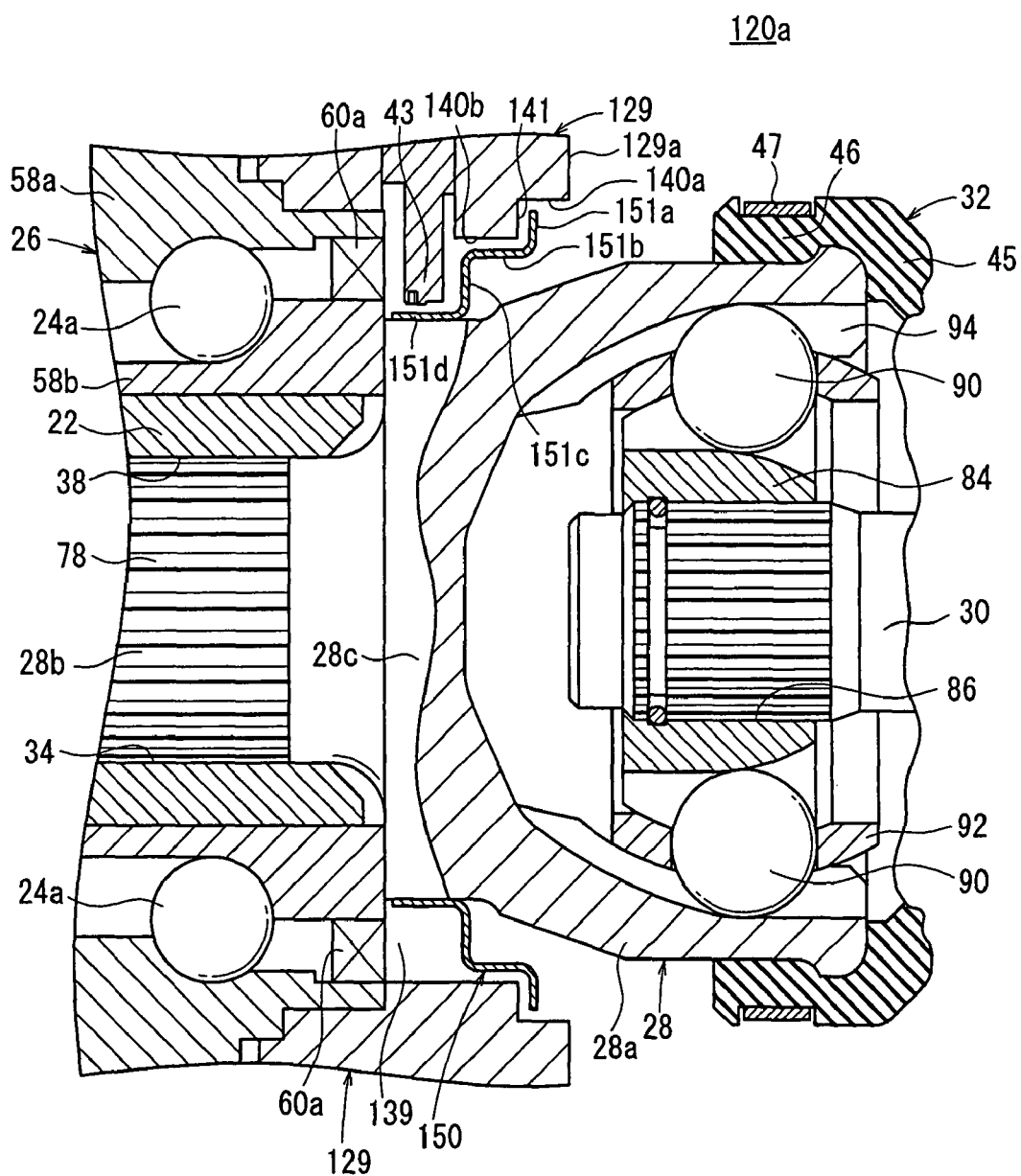
FIG. 11 is a longitudinal cross-sectional view, partly omitted, of a bearing apparatus for a drive wheel, according to a fourth embodiment of the present invention.

With respect to the third embodiment, an explanation has been given concerning the bearing apparatus 120 for a drive wheel, which is applied to a tripod-type constant velocity universal joint. However, the embodiment is not limited in this respect. The bearing apparatus 120 for a drive wheel is also applicable to a Birfield-type constant velocity universal joint 32, as shown in FIG. 11.

The invention claimed is:

1. A bearing apparatus for a drive wheel, comprising:
a hub having a wheel attached thereto;
a hub bearing fitted on an outer circumference of said hub for rotatably supporting said hub with respect to a vehicle body;
an outer race member of a constant velocity universal joint, said outer race member being fitted inside said hub and having a cup portion and a shaft portion; and
a joint boot attached to said cup portion of said outer race member,
wherein a surrounding member is provided that surrounds a part of said cup portion of said outer race member, with a gap, and a first seal member is provided between an inner surface of said surrounding member and an outer surface of said outer race member, and said first seal member is annular in shape and has a substantially U-shaped cross section,
wherein an opening is formed between a circumferential edge of said surrounding member and a large-diameter end portion of said joint boot, and said circumferential edge extends substantially in parallel to an outer surface of said large-diameter end portion of said joint boot,
wherein the circumferential edge of the surrounding member and said outer surface of the large-diameter end portion of said joint boot are spaced apart from each other in an axial direction, and the opening opens in a radial direction, and
wherein a recess is formed on said first seal member and is opened in the axial direction toward an outer surface of said large-diameter end portion of said joint boot.

2. An apparatus according to claim 1, wherein said first seal member comprises a first externally disposed annular side portion, a second internally disposed annular side portion fastened to said outer surface of said outer race member, and a third annular side portion joining said first annular side portion and said second annular side portion, wherein said first annular side portion and said second annular side portion are arranged oppositely and substantially in parallel, and said first annular side portion and said second annular side portion are separated away from each other by a predetermined distance.

3. An apparatus according to claim 1, wherein a radial distance between an outer end of said first seal member and said inner surface of said surrounding member is relatively small compared with other portions in said gap where said first seal member is not disposed.

4. An apparatus according to claim 1, wherein a clearance is provided in the radial direction between an outer circumferential surface of a first externally exposed annular side portion of the first seal member and a first inner circumferential surface of the surrounding member,
wherein the outer circumferential surface of the first externally exposed annular side portion of the first seal member and the first inner circumferential surface of the surrounding member directly face each other.

5. A bearing apparatus for a drive wheel, comprising:
a hub having a wheel attached thereto;
a hub bearing fitted on an outer circumference of said hub for rotatably supporting said hub with respect to a vehicle body;
an outer race member of a constant velocity universal joint, said outer race member being fitted inside said hub and having a cup portion and a shaft portion; and
a joint boot attached to said cup portion of said outer race member,
wherein a surrounding member is provided that surrounds a part of said cup portion of said outer race member, with a gap, and a first seal member is provided between an inner surface of said surrounding member and an outer surface of said outer race member, and said first seal member is annular in shape and has a substantially U-shaped cross section,
wherein an opening is formed between a circumferential edge of said surrounding member and a large-diameter end portion of said joint boot, and said circumferential edge extends substantially in parallel to said outer surface of said outer race member,
wherein a recess is formed on said first seal member and is opened toward said joint boot,
wherein an annular second seal member is provided at a portion that is close to said first seal member, where a projection of said surrounding member faces said outer surface of said outer race member.

6. An apparatus according to claim 5, wherein said second seal member comprises a cylindrical portion, a bent portion, a slanted portion and a circumferential portion, wherein said cylindrical portion is in contact with and fastened to said outer surface of said outer race member, such that said second seal member is held on said outer race member, said bent portion is bent in a direction substantially perpendicular to said cylindrical portion and has an L-shaped cross section, said slanted portion continues from said bent portion and is slanted at a predetermined angle, said circumferential portion continues from said slanted portion and extends radially substantially in parallel, with a predetermined clearance from said projection of said surrounding member.

7. A bearing apparatus for a drive wheel, comprising:
a hub having a wheel attached thereto;
a hub bearing fitted on an outer circumference of said hub for rotatably supporting said hub with respect to a vehicle body; and
an outer race member of a constant velocity universal joint, said outer race member being fitted inside said hub and having a cup portion and a shaft portion;
wherein a surrounding member is provided that surrounds a part of said cup portion of said outer race member, with a gap, and an inner surface of said surrounding member has a stepped cross section, a seal member is provided on said outer race member, and said seal member is annular in shape and has a stepped cross section corresponding to said inner surface of said surrounding member, and
wherein an outside surface of said seal member performs a sealing function to prevent entry of water or muddy water into said gap, by a clearance formed between said inner surface of said surrounding member having the stepped cross section and said outside surface of said seal member, and
wherein an inside surface of said seal member performs a discharging function to trap and discharge to the outside the water or muddy water that is about to enter into said gap.

8. An apparatus according to claim 7, wherein said seal member comprises a first annular side portion, a second annular side portion, a third annular side portion and a fourth annular side portion, and wherein said first annular side portion extends in a direction substantially perpendicular to an axis of said outer race member, said second annular side portion is bent from said first annular side portion and extends substantially in parallel to the axis of said outer race member, said third annular side portion is bent from said second annular side portion and extends in a direction substantially perpendicular to the axis of said outer race member, and said fourth annular side portion is bent from said third annular side portion and extends substantially in parallel to the axis of said outer race member.

9. An apparatus according to claim 7, wherein a clearance is provided in the radial direction between an outer edge of a first annular side portion of the seal member and an inner circumferential surface of the surrounding member,
wherein the outer edge of a first annular side portion of the seal member and the inner circumferential surface of the surrounding member directly face each other.

* * * * *